(12) United States Patent
Jerebko (10) Patent No.: US 7,412,084 B2
(45) Date of Patent: Aug. 12, 2008

(54) METHOD OF ANALYSIS OF LOCAL PATTERNS OF CURVATURE DISTRIBUTIONS

(75) Inventor: Anna Jerebko, West Chester, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 903 days.

(21) Appl. No.: 10/915,071

(22) Filed: Aug. 10, 2004

(65) Prior Publication Data

US 2005/0111713 A1 May 26, 2005

Related U.S. Application Data

(60) Provisional application No. 60/494,909, filed on Aug. 13, 2003.

(51) Int. Cl.
G06K 9/00 (2006.01)

(52) U.S. Cl. .................................. 382/128; 382/203

(58) Field of Classification Search ................. 382/128, 382/131, 132, 203, 286; 600/300
See application file for complete search history.

(56) References Cited

U.S. PATENT DOCUMENTS

| 6,246,784 | B1 | 6/2001 | Summers et al. |
| 6,345,112 | B1 | 2/2002 | Summers et al. |
| 6,556,696 | B1 | 4/2003 | Summers et al. |
| 2002/0097320 | A1 | 7/2002 | Zalis |
| 2003/0223627 | A1 | 12/2003 | Yoshida et al. |

OTHER PUBLICATIONS

Summers, RM et al., "Automated Polyp Detector For CT Colonography: Feasibility Study" Radiology 2000; pp. 216:284-290.

Summers, RM et al., "Automated Polyp Detection at CT Colonography: Feasibility Assessment in a Human Population," Radiology 2001; pp. 219:51-59.

Paik et al., "Computer Aided Detection of Polyps in CT Colonography; Method and Free Response ROC Evaluation of Performance," Radioligy 2000, pp. 217:704.

Masutani, et al., "Computer Aided Detection of Polyps in CT Colonography based on Geometric Features" Proc SPIE 2001, pp. 4321:53-57.

Masutani, et al., "Detection of Colonic Polyps in CT Colonography based on geometric features" Radiology 2000; 217:1555.

Jerebko Anna K et al, "Computer-Assisted Detection of Colonic Polyps with CT Colonography Using Neural Networks and Binary Classification Trees", *Medical Physics*, American Institute of Physics, New York, US, vol. 30, No. 1, Jan. 2003, pp. 52-60.

Jerebko Anna K et al, "Support Vector Machines Committee Classification Method for Computer-Aided Polyp Detection in CT Colonography<1>", *Academic Radiology*, Reston, VA, US, vol. 12, No. 4, Apr. 2005, pp. 479-486.

(Continued)

*Primary Examiner*—Matthew C. Bella
*Assistant Examiner*—Claire Wang (57) ABSTRACT

A method of detecting lesions and polyps in a digital image, wherein said image comprises a plurality of 3D volume points, is provided. The method includes identifying a surface in the image, and for each point in the image, calculating a first curvature measure, forming a set of rings of points about each point, each ring being of equal geodesic distance from a center point for the ring, calculating, for each ring, a standard deviation of the first curvature measure, and selecting those rings with a minimum standard deviation for the first curvature measure. A first curvature slope is calculated for the selected rings, those points where the curvature slope departs from the pattern expected for a polyp or lesion are deleted from the surface.

18 Claims, 5 Drawing Sheets

OTHER PUBLICATIONS

Kubo M et al, "Extraction of Pulmonary Fissures from Thin-Section CT Images Using Calculation of Surface-Curvatures and Morphology Filters", *Image Processing 2000*, Proceedings, 2000 International Conference, Sep. 10-13, 2000, Piscataway, NJ, USA, IEEE, vol. 2, Sep. 10, 2000, pp. 637-640.

Kawata Y et al, "Classification of Pulmonary Nodules in Thin-Section CT Images Based on Shape Characterization", *Image Processing*, 1997, Proceedings, International Conference, Santa Barbara, CA, USA, Oct. 26-29, 1997; Los Alamitos, CA, USA, IEEE Comput. Soc., US, vol. 3, Oct. 26, 1997; pp. 528-530.

Search Report (including Notification of Transmittal of the International Search Report, International Search Report, and Written Opinion of the International Searching Authority).

FIG. 1

A scatter-graph of the curvature distribution

METHOD OF ANALYSIS OF LOCAL PATTERNS OF CURVATURE DISTRIBUTIONS

CROSS REFERENCE TO RELATED UNITED STATES APPLICATIONS

This application claims priority from "Analysis of Local Patterns of Curvature Distributions", Provisional Patent Application No. 60/494,909 of Anna Jerebko, filed Aug. 13, 2003, the contents of which are incorporated herein by reference.

BACKGROUND OF THE INVENTION

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray film radiography, computed tomography ("CT") imaging, magnetic resonance imaging ("MRI"), ultrasound ("US") and nuclear medicine imaging techniques, such as positron emission tomography ("PET") and single photon emission computed tomography ("SPECT"). Digital images can also be created from analog images by, for example, scanning analog images, such as typical x-rays, into a digitized form. However, the large amount of data in digital images is generally difficult and tedious for a human, such as a physician, to interpret without additional aid. Computer-aided diagnosis ("CAD") systems play a critical role in aiding the human, especially in the visualization, segmentation, detection, registration, and reporting of medical pathologies.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system.

One of the more critical CAD tasks includes the screening and early detection of various types of cancer from a volume data (e.g., a CT volume data). For instance, cancers such as colon cancer have shown a decrease in mortality rates resulting from the early detection and removal of cancerous tumors. Pathologies are typically spherical or hemispherical in geometric shape. In many cases, these sphere-like pathologies are attached to linear or piece-wise linear surfaces. Colon polyps, for example, protrude in the lumen from the colon wall and from folds. Unfortunately, existing methods generally do not detect characteristic symptoms of various cancers until the advanced stages of the disease. Therefore, a primary goal in advancing preventive cancer screening is to provide for earlier detection of the characteristic symptoms.

SUMMARY OF THE INVENTION

In one aspect of the invention, a method of detecting lesions and polyps in a digital image, wherein said image comprises a plurality of 3D volume points, is provided. The method includes identifying a surface in said image, calculating, for each point in the surface, a first curvature measure, forming, for each point in the surface, a set of rings of points about each said point, wherein each said point is a center point with respect to it's set of rings, each ring being of equal geodesic distance from the center point for the ring, calculating, for each ring, a standard deviation of the first curvature measure, selecting those rings with a minimum standard deviation for the first curvature measure, calculating, for the selected rings, a first curvature slope, and deleting from the surface those points where the curvature slope departs from the pattern expected for a polyp or lesion.

In a further aspect of the invention, the method includes clustering the remaining points in said surface to form one or more clusters, calculating, for each cluster, a first curvature slope extreme value, selecting the cluster with a most extreme value of the first curvature slope extreme value for each of cluster, and identifying the selected cluster with a lesion of interest, interpolating an underlying surface of the lesion of interest. The underlying surface separates said lesion from tissue underneath the lesion.

In another aspect of the invention, a method of detecting lesions and polyps in a digital image, wherein said image comprises a plurality of 3D volume points, is provided. The method includes identifying a surface in said image, calculating, for each point in the surface, a Gaussian curvature and a Mean curvature, forming, for each point in the surface, a set of rings of points about each said point, wherein each said point is a center point with respect to it's set of rings, each ring being of equal geodesic distance from the center point for the ring, calculating, for each ring, a standard deviation of the Gaussian curvature and a standard deviation of the Mean curvature, selecting those rings with a minimum standard deviation for the Gaussian curvature and the Mean curvature, calculating, for the selected rings, a Gaussian curvature slope and a Mean curvature slope, and deleting from the surface those points where the Gaussian curvature slope is greater than or equal to zero, or where the Mean curvature slope is less than or equal to zero.

In a further aspect of the invention, the method includes clustering the remaining points in said surface to form one or more clusters, calculating, for each cluster, a minimum Gaussian curvature slope and a maximum Mean curvature slope, selecting the cluster with a smallest Gaussian curvature slope and a largest Mean curvature slope, and identifying the selected cluster with a lesion of interest, and interpolating an underlying surface of the lesion of interest. The underlying surface separates said lesion from tissue underneath the lesion.

In another aspect of the invention, a program storage device readable by a computer, tangibly embodying a program of instructions executable by the computer to perform the method steps for detecting lesions and polyps in a digital image, wherein said image comprises a plurality of 3D volume points, is provided. The method includes identifying a surface in said image, calculating, for each point in the surface, a first curvature measure, forming, for each point in the surface, a set of rings of points about each said point, wherein each said point is a center point with respect to it's set of rings, each ring being of equal geodesic distance from the center point for the ring, calculating, for each ring, a standard deviation of the first curvature measure, selecting those rings with a minimum standard deviation for the first curvature measure, calculating, for the selected rings, a first curvature slope, and deleting from the surface those points where the curvature slope departs from the pattern expected for a polyp or lesion.

In a further aspect of the invention, the method includes clustering the remaining points in said surface to form one or more clusters, calculating, for each cluster, a first curvature slope extreme value, selecting the cluster with a most extreme value of the first curvature slope extreme value for each of cluster, and identifying the selected cluster with a lesion of interest, and interpolating an underlying surface of the lesion of interest. The said underlying surface separates said lesion from tissue underneath the lesion.

DETAILED DESCRIPTION OF THE PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The methods described below relates to finding abnormal structures in 3D volumetric medical images, for example, but not limited to, CT or MRI images. The method can be applied to detecting and characterizing polyps or other lesions on the surfaces of hollow organs in the human body like airways, colon, urinary and gall bladder, finding plaque buildup in arteries etc. Prior to application of the methods of the invention the 3D volumetric image has been preprocessed to detect the surface of the organ of interest. Any method of detection of the organ surface, which is the boundary between the hollow organ tissue and air or fluid or other matter (for example stool in the colon) can be used, for example 3D Canny edge detector.

Existing methods for analyzing a colonic polyp's curvature and shape take into account that part of the polyp or polyp surface that has spherical or elliptical shape. However, a curvature transition occurs along the border where the polyp protrudes from the colon wall. The methods disclosed herein are based on an analysis of the curvature distribution along the geodesic distance from the prospective polyp surface center towards that part of the surface where the polyp merges with the surrounding tissue. These methods are based on an assumption that voxels closest to the polyp center on the lesion surfaced will have a curvature whose magnitude is at a maximum and that the magnitude of the curvature decreases as one moves away from the lesion center.

Different measures of curvature, such as Gaussian, Principal, Mean, Min, Max, etc., and their patterns can be considered either jointly or separately. Gaussian curvature, for example, decreases with the increase of geodesic distance from the polyp surface center, and becomes negative or equal to zero where the polyp merges with the surrounding tissue. The Mean curvature follows the opposite pattern.

The preferred methods of the invention involve calculating at least one of the Mean and Gaussian curvatures in all points (voxels) of the surface, and more preferably both the Mean and Gaussian curvatures. Note that other measures of surface curvature can be used without departing from the scope of the invention. Although the invention will be explained in terms of Gaussian and Mean curvatures, the methods disclosed herein are not limited to the disclosed curvature measures. Existing methods for lesion curvature and shape analysis take in account that part of the lesion or it's surface that have a spherical or elliptical shape. The assumption here is that the lesions of interest are protruding from an organ surface and have more or less symmetrical shape, with the emphasis on the symmetry. The curvature of concentric rings on a lesion surface aligned with the lesion top central spot would have small variance within the ring and would follow a particular pattern: the curvature gradually changes from top of the lesion to that part of the surface where the lesion merges with the surrounding tissue. These methods could also be applied to find a cavity in the surface of an organ, for example colonic diverticulas, as the curvature would then follow a reverse pattern.

Figure 1:
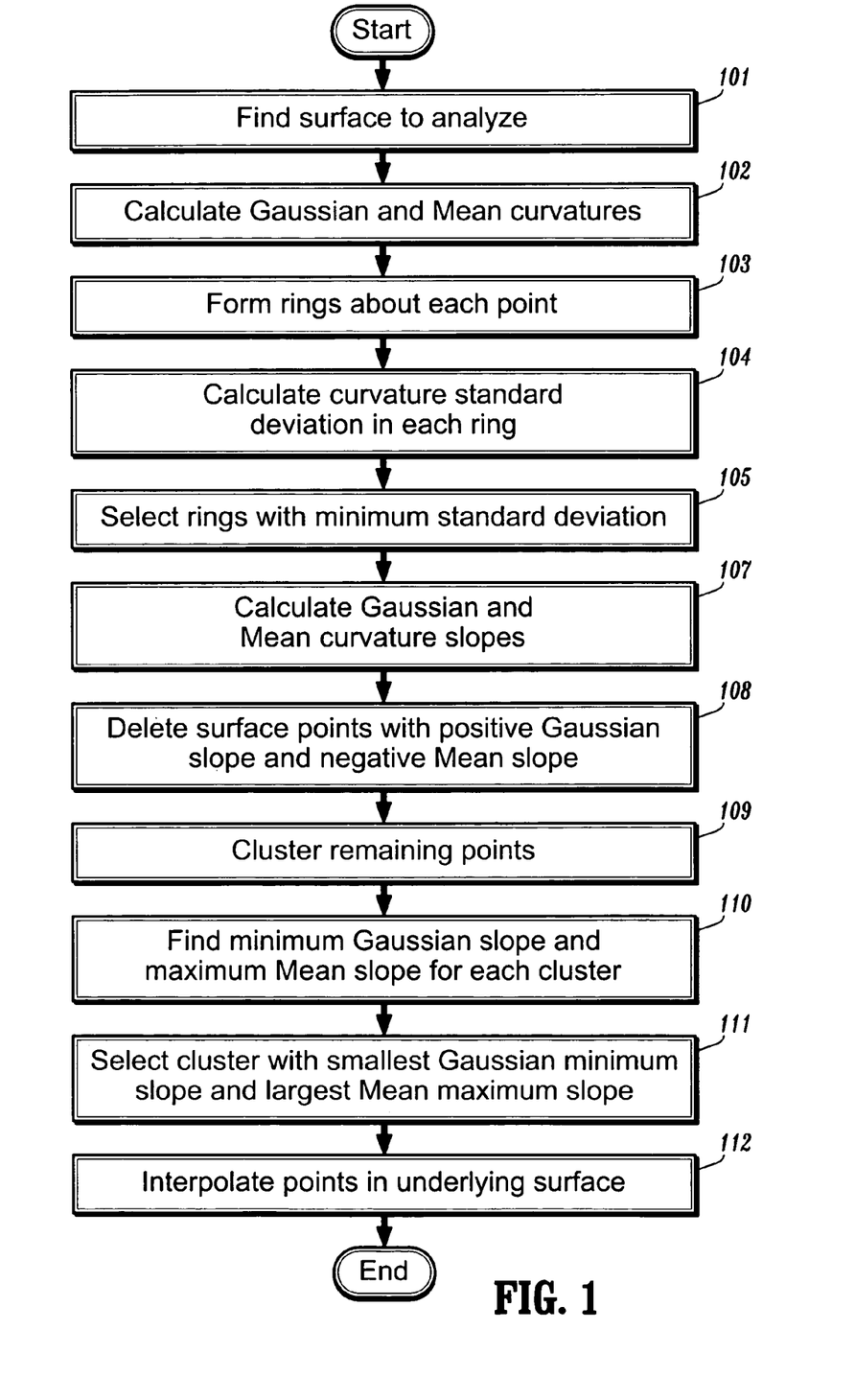
FIG. 1 depicts a flow chart of a preferred method of the invention.

The analysis of the curvature distribution is performed along the radial distance from the prospective lesion center and includes that part of the surface where the polyp merges with the surrounding tissue. Voxels closest to the polyp center on the lesion surface would have the maximum Gaussian curvature, and that Gaussian curvature decreases with the increase of the distance from the polyp center and becomes negative or close to zero where polyp merges with the surrounding tissue (FIG. 1). The Mean curvature follows the opposite pattern.

Figure 2:
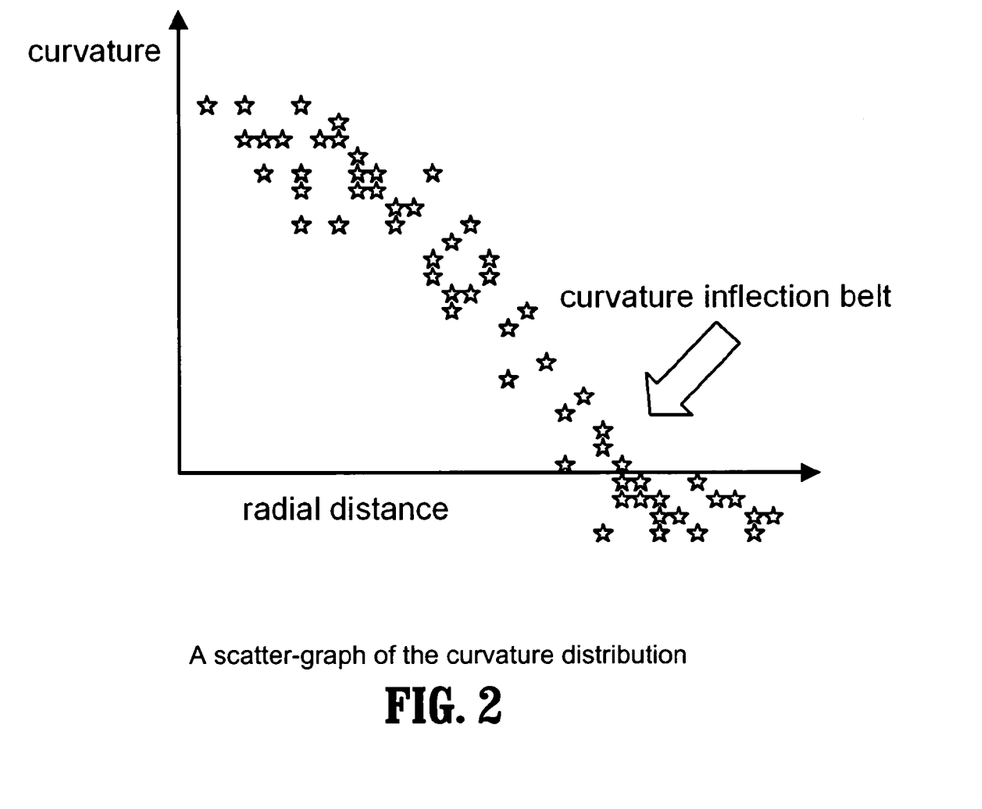
FIG. 2 depicts an example of a cosine shaped curvature distribution.

When considering Gaussian curvature, the most common pattern of curvature distribution along the radius in all directions from the center can be roughly described by the cosine function: maximum curvature in the central spot, gradually decreasing with the distance, possibly becoming negative in the inflection belt, and then rising again. Cosine shaped curvature transition patterns identify possible more or less round-shaped polyp candidates. An example of a cosine shaped curvature distribution is presented in FIG. 2. Non flat lesions like colonic polyps and airway lesions protrude in the lumen from the colon wall and from folds of a healthy surface. Along the protrusion border a curvature transition occurs.

Uneven lesion surfaces, possible flattened or elongated or irregular polyp shape and attached fold-like structures, cause non-ideal behavior. The patterns of curvature will progressively spread from a cosine-like shape as the surface increasingly differs from an ideal hemi-spherical shape. The actual curvature values could be scattered over a considerably wide angle. But a majority of the lesions would follow the "cosine" pattern of the surface curvature distribution, unlike healthy structures in the same organ, which makes it possible to use a "cosine" curvature distribution pattern as a feature for automatic lesion detection. Unlike methods that focus on sphericity or the curvatures themselves, including Gaussian, mean and principal curvatures, the curvature slope combined with the standard deviation of the curvature in the inflection belt is a scale invariant measure of lesion roundness and symmetry.

A preferred method of the invention involves intensity-based computed curvatures at all points along the inner wall of an organ. At each location a scatter-graph of a curvature distribution within a radius of the selected position is computed and analyzed. Referring now to FIG. 1, initially, at step 101, a 3D edge detection method is applied to a volume of interest to find the surface voxels of the inner wall of the organ. One non-limiting example of an edge detection method is the Canny edge detector, which produces thin and continuous edges.

Once a surface has been identified, the Mean (H) and/or Gaussian Curvatures (K) are calculated for each surface voxel at step 102. For a gray-scale image I (x, y, z), the Gaussian (K) and mean (H) curvatures can be defined by:

$$K = \frac{1}{h^2}\begin{bmatrix} I_x^2(I_{yy}I_{zz} - I_{yz}^2) + 2I_yI_z(I_{xz}I_{xy} - I_{xx}I_{yz}) + \\ I_y^2(I_{xx}I_{zz} - I_{yz}^2) + 2I_xI_z(I_{yz}I_{xy} - I_{yy}I_{xz}) + \\ I_z^2(I_{xx}I_{yy} - I_{xy}^2) + 2I_xI_y(I_{xz}I_{yz} - I_{zz}I_{xy}) \end{bmatrix} \quad (1)$$

$$H = \frac{1}{2h^{3/2}}\begin{bmatrix} I_x^2(I_{yy} + I_{zz}) - 2I_yI_zI_{yz} + \\ I_y^2(I_{xx} + I_{zz}) - 2I_xI_yI_{xz} + \\ I_z^2(I_{xx} + I_{yy}) - 2I_xI_yI_{xy} \end{bmatrix} \quad (2)$$

where I (x, y, z) represent the vertex intensities for a surface (x, y, z)∈R³, $I_x$ indicates the partial derivative of the image data with respect to x, $I_{xz}$ indicates the mixed partial derivative with respect to x and z, etc., and $h = I_x^2 + I_y^2 + I_z^2$.

Figure 3A:
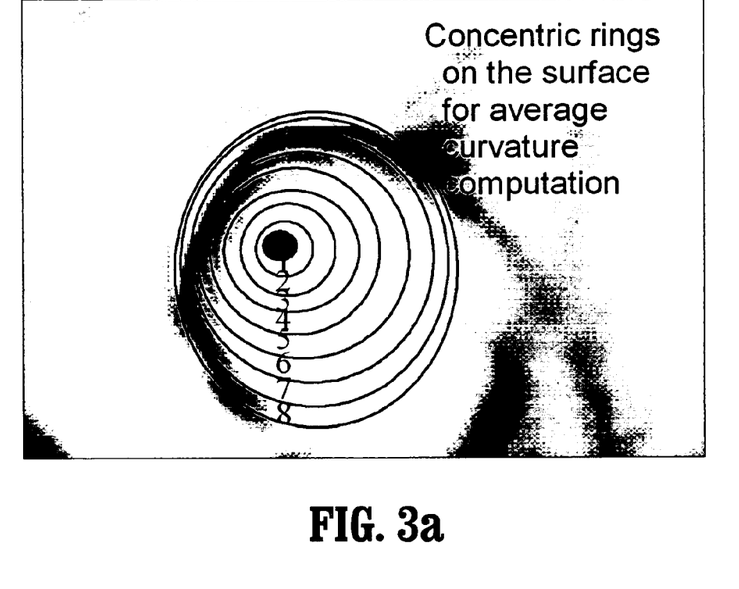
FIG. 3a-b depict a colon polyp with superimposed rings, and a colon polyp with a superimposed center, inflection belt, and the radial directions of a curvature computation.

Rings are formed about each surface voxel at step 103 from voxels of equal geodesic distance from the center, and the average Mean (H) and Gaussian (K) curvatures can be calculated for all surface voxels within each ring. For example, integer numbers could be used as distances to form the rings: a 1st (central) ring is formed by voxels lying at the distance D up to 1 mm (D<=1 mm) from the current central voxel, the next ring is formed by voxels at the distances 1 mm<D<=2 mm, etc. For better precision, rings of finer gradation could be used. FIG. 3a depicts a colon polyp with superimposed rings on the surface of the polyp. Then, at step 104, within each ring, the standard deviations of the Gaussian and Mean curvatures can be calculated. Those rings for which the standard deviation of the curvature is a minimum are selected at step 105. Within that set of rings, one then further selects those rings where the curvature has an extreme value, that is, having either a minimal Gaussian curvature ($K_{min}$) or a maximum Mean curvature ($H_{max}$), or both, to obtain a set of concentric rings whose center defines a center of the structure of interest.

Given a set of rings with either minimal Gaussian curvature ($K_{min}$) or maximum Mean curvature ($H_{max}$), the curvature slopes can be calculated at step 107 as:

$$S_K = (K_c - K_{min})/D_{Kmin},$$

$$S_H = (H_c - H_{max})/D_{Kmax},$$

where:
$S_K$ is the Gaussian curvature slope;
$S_H$ is the Mean curvature slope;
$K_c$ is the Gaussian curvature in the central ring;
$K_{min}$ is the curvature of the ring having minimum Gaussian curvature;
$H_c$ is the Mean curvature in the central ring;
$H_{max}$ is the curvature of the ring having maximum Mean curvature;
$D_{Kmin}$ is the distance corresponding to the ring having minimal Gaussian curvature; and
$D_{Kmax}$ is the distance corresponding to the ring having maximum Mean curvature.

Figure 3B:
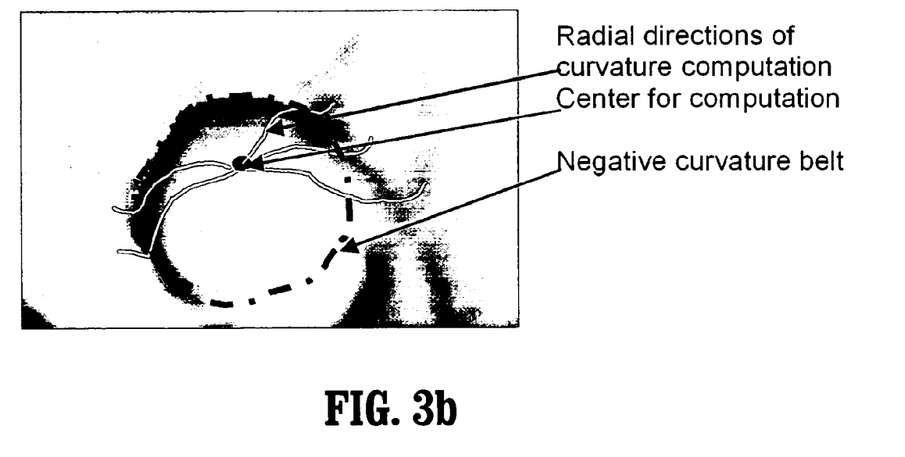
Figure 4:
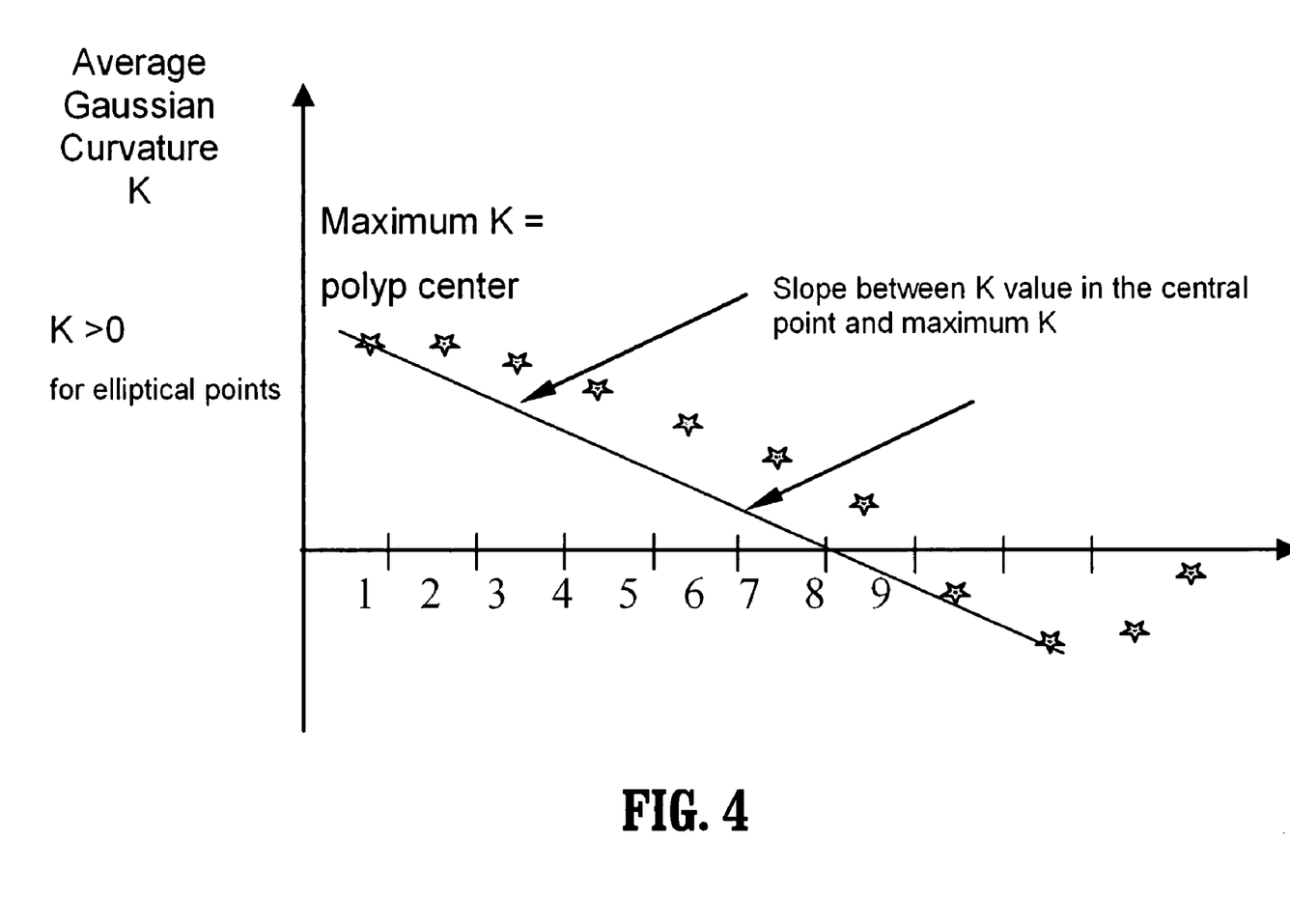
FIG. 4 presents a scatter-plot graph of curvature points along with the computer curvature slopes for $S_K$ and $S_H$.

FIG. 3b depicts the radial directions of a curvature computation, along with the center of computation and the negative curvature inflection belt. FIG. 4 presents a scatter-plot graph of curvature points along with the computer curvature slopes for $S_K$ and $S_H$. When a central ring is located on the top of the polypoid structure, the rings having an extreme value of the curvature, such as a minimal Gaussian curvature and/or a maximum Mean curvature, are likely to correspond to the lesion's inflection belt. The voxels having negative Gaussian curvature slope and (or) positive Mean curvature slope are likely to correspond to a polyp or another bump on the surface. The folds or other cylindrical objects could also have the same properties, but the curvature standard deviations within the rings having minimal Gaussian curvature and/or maximum Mean curvature are significantly higher in the folds than in the polyps (or other elliptical surface points). Under this assumption, at step 108, one can delete all surface voxels where $S_K >= 0$ and/or $S_H <= 0$ as belonging to a flat surface or to pits rather than lesions. One can further set thresholds for the magnitudes of $S_K$ and $S_H$ to further distinguish lesions from other surface structures.

Clustering is performed for the remaining surface voxels at step 109. For each cluster, the extreme values of the curvature slope, the minimum $S_K$ and (or) maximum $S_H$, are calculated at step 110. Within a given sub volume of interest, the cluster having minimum $S_K$ or maximum $S_H$ among all clusters is then selected at step 111 as the cluster corresponding to the lesion of interest. The lesion surface is represented by the voxels belonging to the winning cluster. The underlying surface separating the lesion volume from the tissue underneath is then determined by interpolation at step 112. The voxels between the surfaces determined by the winning cluster and the interpolated cutting surface are considered as belonging to the lesion.

A preferred method such as that described above can without limitation be applied to colonic, airway and other organ's lesion detection in different imaging modalities, such as CT, MR, US, PET, etc.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
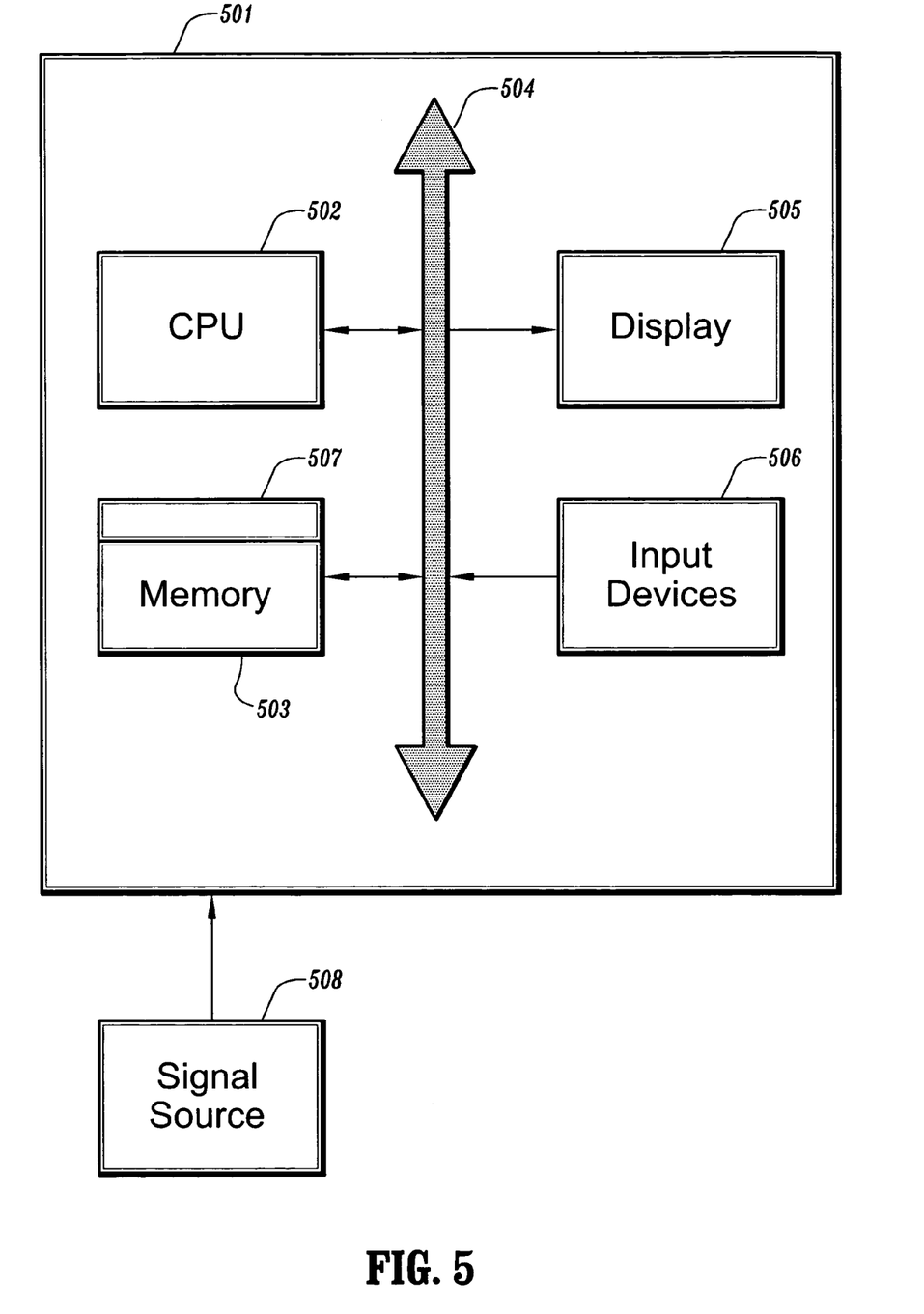
FIG. 5 depicts an exemplary computer system for implementing a preferred embodiment of the invention.

Referring now to FIG. 5, according to an embodiment of the present invention, a computer system 501 for implementing the present invention can comprise, inter alia, a central processing unit (CPU) 502, a memory 503 and an input/ output (I/O) interface 504. The computer system 501 is generally coupled through the I/O interface 504 to a display 505 and various input devices 506 such as a mouse and a keyboard. The support circuits can include circuits such as cache, power supplies, clock circuits, and a communication bus. The memory 503 can include random access memory (RAM), read only memory (ROM), disk drive, tape drive, etc., or a combinations thereof. The present invention can be implemented as a routine 507 that is stored in memory 503 and executed by the CPU 502 to process the signal from the signal source 508. As such, the computer system 501 is a general purpose computer system that becomes a specific purpose computer system when executing the routine 507 of the present invention.

The computer system 501 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of detecting lesions and polyps in a digital image, wherein said image comprises a plurality of 3D volume points, said method comprising the steps of:
   identifying a surface in said image;
   calculating, for each point in the surface, a first curvature measure;
   forming, for each point in the surface, a set of rings of points about each said point, wherein each said point is a center point with respect to it's set of rings, each ring being of equal geodesic distance from the center point for the ring;
   calculating, for each ring, a standard deviation of the first curvature measure;
   selecting those rings with a minimum standard deviation for the first curvature measure;
   calculating, for the selected rings, a first curvature slope; and
   deleting from the surface those points where the curvature slope departs from the pattern expected for a polyp or lesion.

2. The method of claim 1, further comprising the steps of:
   clustering the remaining points in said surface to form one or more clusters;
   calculating, for each cluster, a first curvature slope extreme value;
   selecting the cluster with a most extreme value of the first curvature slope extreme value for each of cluster, and identifying the selected cluster with a lesion of interest; and
   interpolating an underlying surface of the lesion of interest, said underlying surface separating said lesion from tissue underneath the lesion.

3. The method of claim 2, wherein said first curvature measure is a Gaussian curvature defined as $$K = \frac{1}{h^2} \begin{bmatrix} I_x^2(I_{yy}I_{zz} - I_{yz}^2) + 2I_yI_z(I_{xz}I_{xy} - I_{xx}I_{yz}) + \\ I_y^2(I_{xx}I_{zz} - I_{yz}^2) + 2I_xI_z(I_{yz}I_{xy} - I_{yy}I_{xz}) + \\ I_z^2(I_{xx}I_{yy} - I_{xy}^2) + 2I_xI_y(I_{xz}I_{yz} - I_{zz}I_{xy}) \end{bmatrix},$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h = I_x^2 + I_y^2 + I_z^2$, and
   wherein the first curvature slope is a Gaussian curvature slope defined by $S_K = (K_c - K_{min})/D_{Kmin},$ wherein
   $S_K$ is the Gaussian curvature slope,
   $K_c$ is the Gaussian curvature in a central ring,
   $K_{min}$ is the curvature of a ring having a minimum Gaussian curvature, and
   $D_{Kmin}$ is a distance corresponding to the ring having minimal Gaussian curvature, and
   wherein the Gaussian curvature slope is less than zero for a polyp or lesion, the curvature slope extreme value is a minimum curvature slope for a given cluster, and the most extreme value of each of the extreme values is the smallest Gaussian curvature slope.

4. The method of claim 2, wherein said first curvature measure is a Mean curvature defined by $$H = \frac{1}{2h^{3/2}} \begin{bmatrix} I_x^2(I_{yy} + I_{zz}) - 2I_yI_zI_{yz} + \\ I_y^2(I_{xx} + I_{zz}) - 2I_xI_yI_{xz} + \\ I_z^2(I_{xx} + I_{yy}) - 2I_xI_yI_{xy} \end{bmatrix}$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h = I_x^2 + I_y^2 + I_z^2$, and
   wherein the first curvature slope is a Mean curvature slope defined by $S_H = (H_c - H_{max})/D_{Kmax},$ wherein
   $S_H$ is the Mean curvature slope,
   $H_c$ is the Mean curvature in a central ring,
   $H_{max}$ is the curvature of a ring having a maximum Mean curvature, and $D_{Kmax}$ is a distance corresponding to the ring having maximum Mean curvature, and wherein the Mean curvature slope is greater than zero for a polyp or lesion, the curvature slope extreme value is a maximum curvature slope for a given cluster, and the most extreme value of each of the extreme values is the largest Mean curvature slope.

5. The method of claim 2, further comprising:

calculating, for each point in the surface, a second curvature measure;

calculating, for each ring in the surface, a standard deviation of the second curvature measure;

selecting those rings with a minimum standard deviation for the second curvature measure;

calculating, for the selected rings, a second curvature slope;

deleting from the surface those points where the first curvature slope and the second curvature slope depart from the pattern expected for a polyp or lesion;

calculating, for each cluster, a second curvature slope extreme value; and selecting the cluster with a most extreme value of the first curvature slope extreme value and a most extreme value for the second curvature slope extreme value, to identify the selected cluster with a lesion of interest.

6. The method of claim 5, wherein said first curvature measure is a Gaussian curvature defined as $$K = \frac{1}{h^2}\begin{bmatrix} I_x^2(I_{yy}I_{zz} - I_{yz}^2) + 2I_yI_z(I_{xz}I_{xy} - I_{xx}I_{yz}) + \\ I_y^2(I_{xx}I_{zz} - I_{yz}^2) + 2I_xI_z(I_{yz}I_{xy} - I_{yy}I_{xz}) + \\ I_z^2(I_{xx}I_{yy} - I_{xy}^2) + 2I_xI_y(I_{xz}I_{yz} - I_{zz}I_{xy}) \end{bmatrix},$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h = I_x^2 + I_y^2 + I_z^2$, and wherein the first curvature slope is a Gaussian curvature slope defined by $$S_K = (K_c - K_{min})/D_{Kmin},$$

wherein $S_K$ is the Gaussian curvature slope, $K_c$ is the Gaussian curvature in a central ring, $K_{min}$ is the curvature of a ring having a minimum Gaussian curvature, and $D_{Kmin}$ is a distance corresponding to the ring having minimal Gaussian curvature, and wherein the Gaussian curvature slope is less than zero for a polyp or lesion, the curvature slope extreme value is a minimum curvature slope for a given cluster, and the most extreme value of each of the extreme values is the smallest Gaussian curvature slope.

7. The method of claim 5, wherein said second curvature measure is a Mean curvature defined by $$H = \frac{1}{2h^{3/2}}\begin{bmatrix} I_x^2(I_{yy} + I_{zz}) - 2I_yI_zI_{yz} + \\ I_y^2(I_{xx} + I_{zz}) - 2I_xI_zI_{xz} + \\ I_z^2(I_{xx} + I_{yy}) - 2I_xI_yI_{xy} \end{bmatrix}$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h = I_x^2 + I_y^2 + I_z^2$, and wherein the second curvature slope is a Mean curvature slope defined by $$S_H = (H_c - H_{max})/D_{Kmax},$$

wherein $S_H$ is the Mean curvature slope, $H_c$ is the Mean curvature in a central ring, $H_{max}$ is the curvature of a ring having a maximum Mean curvature, and $D_{Kmax}$ is a distance corresponding to the ring having maximum Mean curvature, and wherein the Mean curvature slope is greater than zero for a polyp or lesion, the curvature slope extreme value is a maximum curvature slope for a given cluster, and the most extreme value of each of the extreme values is the largest Mean curvature slope.

8. A method of detecting lesions and polyps in a digital image, wherein said image comprises a plurality of 3D volume points, said method comprising the steps of:

identifying a surface in said image;

calculating, for each point in the surface, a Gaussian curvature and a Mean curvature;

forming, for each point in the surface, a set of rings of points about each said point, wherein each said point is a center point with respect to it's set of rings, each ring being of equal geodesic distance from the center point for the ring;

calculating, for each ring, a standard deviation of the Gaussian curvature, and a standard deviation of the Mean curvature;

selecting those rings with a minimum standard deviation for the Gaussian curvature and the Mean curvature;

calculating, for the selected rings, a Gaussian curvature slope and a Mean curvature slope; and deleting from the surface those points where the Gaussian curvature slope is greater than or equal to zero, or where the Mean curvature slope is less than or equal to zero.

9. The method of claim 8, further comprising the steps of:

clustering the remaining points in said surface to form one or more clusters;

calculating, for each cluster, a minimum Gaussian curvature slope and a maximum Mean curvature slope;

selecting the cluster with a smallest Gaussian curvature slope and a largest Mean curvature slope, and identifying the selected cluster with a lesion of interest; and interpolating an underlying surface of the lesion of interest, said underlying surface separating said lesion from tissue underneath the lesion.

10. The method of claim 9, wherein said Gaussian curvature is defined as $$K = \frac{1}{h^2}\begin{bmatrix} I_x^2(I_{yy}I_{zz} - I_{yz}^2) + 2I_yI_z(I_{xz}I_{xy} - I_{xx}I_{yz}) + \\ I_y^2(I_{xx}I_{zz} - I_{yz}^2) + 2I_xI_z(I_{yz}I_{xy} - I_{yy}I_{xz}) + \\ I_z^2(I_{xx}I_{yy} - I_{xy}^2) + 2I_xI_y(I_{xz}I_{yz} - I_{zz}I_{xy}) \end{bmatrix},$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h=I_x^2+I_y^2+I_z^2$, and the Gaussian curvature slope is defined by $$S_K=(K_c-K_{min})/D_{Kmin},$$

wherein $S_K$ is the Gaussian curvature slope, $K_c$ is the Gaussian curvature in a central ring, $K_{min}$ is the curvature of a ring having a minimum Gaussian curvature, and $D_{Kmin}$ is a distance corresponding to the ring having minimal Gaussian curvature.

11. The method of claim 9, wherein said Mean curvature is defined by $$H = \frac{1}{2h^{3/2}} \begin{bmatrix} I_x^2(I_{yy}+I_{zz}) - 2I_yI_zI_{yz} + \\ I_y^2(I_{xx}+I_{zz}) - 2I_xI_yI_{xz} + \\ I_z^2(I_{xx}+I_{yy}) - 2I_xI_yI_{xy} \end{bmatrix}$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h=I_x^2+I_y^2+I_z^2$, and wherein the Mean curvature slope is defined by $$S_H=(H_c-H_{max})/D_{Kmax},$$

wherein $S_H$ is the Mean curvature slope, $H_c$ is the Mean curvature in a central ring, $H_{max}$ is the curvature of a ring having a maximum Mean curvature, and $D_{Kmax}$ is a distance corresponding to the ring having maximum Mean curvature.

12. A program storage device readable by a computer, tangibly embodying a program of instructions executable by the computer to perform the method steps for detecting lesions and polyps in a digital image, wherein said image comprises a plurality of 3D volume points, said method comprising the steps of:

identifying a surface in said image;

calculating, for each point in the surface, a first curvature measure;

forming, for each point in the surface, a set of rings of points about each said point, wherein each said point is a center point with respect to it's set of rings, each ring being of equal geodesic distance from the center point for the ring;

calculating, for each ring, a standard deviation of the first curvature measure;

selecting those rings with a minimum standard deviation for the first curvature measure;

calculating, for the selected rings, a first curvature slope; and deleting from the surface those points where the curvature slope departs from the pattern expected for a polyp or lesion.

13. The computer readable program storage device of claim 12, wherein the method further comprises the steps of:

clustering the remaining points in said surface to form one or more clusters;

calculating, for each cluster, a first curvature slope extreme value;

selecting the cluster with a most extreme value of the first curvature slope extreme value for each of cluster, and identifying the selected cluster with a lesion of interest; and interpolating an underlying surface of the lesion of interest, said underlying surface separating said lesion from tissue underneath the lesion.

14. The computer readable program storage device of claim 13, wherein said first curvature measure is a Gaussian curvature defined as $$K = \frac{1}{h^2} \begin{bmatrix} I_x^2(I_{yy}I_{zz}-I_{yz}^2) + 2I_yI_z(I_{xz}I_{xy}-I_{xx}I_{yz}) + \\ I_y^2(I_{xx}I_{zz}-I_{yz}^2) + 2I_xI_z(I_{yz}I_{xy}-I_{yy}I_{xz}) + \\ I_z^2(I_{xx}I_{yy}-I_{xy}^2) + 2I_xI_y(I_{xz}I_{yz}-I_{zz}I_{xy}) \end{bmatrix},$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h=I_x^2+I_y^2+I_z^2$, and wherein the first curvature slope is a Gaussian curvature slope defined by $$S_K=(K_c-K_{min})/D_{Kmin},$$

wherein $S_K$ is the Gaussian curvature slope, $K_c$ is the Gaussian curvature in a central ring, $K_{min}$ is the curvature of a ring having a minimum Gaussian curvature, and $D_{Kmin}$ is a distance corresponding to the ring having minimal Gaussian curvature, and wherein the Gaussian curvature slope is less than zero for a polyp or lesion, the curvature slope extreme value is a minimum curvature slope for a given cluster, and the most extreme value of each of the extreme values is the smallest Gaussian curvature slope.

15. The computer program storage device of claim 13, wherein said first curvature measure is a Mean curvature defined by $$H = \frac{1}{2h^{3/2}} \begin{bmatrix} I_x^2(I_{yy}+I_{zz}) - 2I_yI_zI_{yz} + \\ I_y^2(I_{xx}+I_{zz}) - 2I_xI_yI_{xz} + \\ I_z^2(I_{xx}+I_{yy}) - 2I_xI_yI_{xy} \end{bmatrix}$$

wherein I represents an intensity that is a function of the point on said surface with coordinates $(x, y, z) \in R^3$, a single subscript on I represents a partial derivative of I with respect to the coordinate indicated by said subscript, a double subscript on I represents a mixed partial derivative with respect to the coordinates indicated by said subscripts, and $h=I_x^2+I_y^2+I_z^2$, and wherein the first curvature slope is a Mean curvature slope defined by $$S_H = (H_c - H_{max})/D_{Kmax},$$

wherein
$S_H$ is the Mean curvature slope,
$H_c$ is the Mean curvature in a central ring,
$H_{max}$ is the curvature of a ring having a maximum Mean curvature, and
$D_{Kmax}$ is a distance corresponding to the ring having maximum Mean curvature, and
wherein the Mean curvature slope is greater than zero for a polyp or lesion, the curvature slope extreme value is a maximum curvature slope for a given cluster, and the most extreme value of each of the extreme values is the largest Mean curvature slope.

16. The computer readable program storage device of claim 13, wherein the method further comprises the steps of:
calculating, for each point in the surface, a second curvature measure;
calculating, for each ring in the surface, a standard deviation of the second curvature measure;
selecting those rings with a minimum standard deviation for the second curvature measure;
calculating, for the selected rings, a second curvature slope;
deleting from the surface those points where the first curvature slope and the second curvature slope depart from the pattern expected for a polyp or lesion;
calculating, for each cluster, a second curvature slope extreme value; and
selecting the cluster with a most extreme value of the first curvature slope extreme value and a most extreme value for the second curvature slope extreme value, to identify the selected cluster with a lesion of interest.

17. The computer readable program storage device of claim 16, wherein said first curvature measure is a Gaussian curvature defined as $$K = \frac{1}{h^2} \begin{bmatrix} I_x^2(I_{yy}I_{zz} - I_{yz}^2) + 2I_yI_z(I_{xz}I_{xy} - I_{xx}I_{yz}) + \\ I_y^2(I_{xx}I_{zz} - I_{yz}^2) + 2I_xI_z(I_{yz}I_{xy} - I_{yy}I_{xz}) + \\ I_z^2(I_{xx}I_{yy} - I_{xy}^2) + 2I_xI_y(I_{xz}I_{yz} - I_{zz}I_{xy}) \end{bmatrix},$$

wherein I represents an intensity that is a function of the point on said surface with coordinates (x, y, z)$\in R^3$, a single subscript on I represents a partial derivative of I with respect to the coordinate indicated by said subscript, a double subscript on I represents a mixed partial derivative with respect to the coordinates indicated by said subscripts, and $h = I_x^2 + I_y^2 + I_z^2$, and wherein the first curvature slope is a Gaussian curvature slope defined by $$S_K = (K_c - K_{min})/D_{Kmin},$$

wherein
$S_K$ is the Gaussian curvature slope,
$K_c$ is the Gaussian curvature in a central ring,
$K_{min}$ is the curvature of a ring having a minimum Gaussian curvature, and
$D_{Kmin}$ is a distance corresponding to the ring having minimal Gaussian curvature, and
wherein the Gaussian curvature slope is less than zero for a polyp or lesion, the curvature slope extreme value is a minimum curvature slope for a given cluster, and the most extreme value of each of the extreme values is the smallest Gaussian curvature slope.

18. The computer readable program storage device of claim 16, wherein said second curvature measure is a Mean curvature defined by $$H = \frac{1}{2h^{3/2}} \begin{bmatrix} I_x^2(I_{yy} + I_{zz}) - 2I_yI_zI_{yz} + \\ I_y^2(I_{xx} + I_{zz}) - 2I_xI_zI_{xz} + \\ I_z^2(I_{xx} + I_{yy}) - 2I_xI_yI_{xy} \end{bmatrix}$$

wherein I represents an intensity that is a function of the point on said surface with coordinates (x, y, z)$\in R^3$, a single subscript on I represents a partial derivative of I with respect to the coordinate indicated by said subscript, a double subscript on I represents a mixed partial derivative with respect to the coordinates indicated by said subscripts, and $h = I_x^2 + I_y^2 + I_z^2$, and
wherein the second curvature slope is a Mean curvature slope defined by $$S_H = (H_c - H_{max})/D_{Kmax},$$

wherein
$S_H$ is the Mean curvature slope,
$H_c$ is the Mean curvature in a central ring,
$H_{max}$ is the curvature of a ring having a maximum Mean curvature, and
$D_{Kmax}$ is a distance corresponding to the ring having maximum Mean curvature, and
wherein the Mean curvature slope is greater than zero for a polyp or lesion, the curvature slope extreme value is a maximum curvature slope for a given cluster, and the most extreme value of each of the extreme values is the largest Mean curvature slope.

* * * * *